United States Patent
Edwards et al.

(10) Patent No.: US 10,089,498 B2
(45) Date of Patent: Oct. 2, 2018

(54) MEMORY INTEGRITY CHECKING

(71) Applicant: HEWLETT PACKARD ENTERPRISE DEVELOPMENT LP, Houston, TX (US)

(72) Inventors: Nigel Edwards, Bristol (GB); Chris I. Dalton, Bristol (GB); Paolo Faraboschi, Palo Alto, CA (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 127 days.

(21) Appl. No.: 15/021,022

(22) PCT Filed: Oct. 31, 2013

(86) PCT No.: PCT/US2013/067766
§ 371 (c)(1),
(2) Date: Mar. 10, 2016

(87) PCT Pub. No.: WO2015/065431
PCT Pub. Date: May 7, 2015

(65) Prior Publication Data
US 2016/0232379 A1    Aug. 11, 2016

(51) Int. Cl.
*G06F 21/00*    (2013.01)
*G06F 21/64*    (2013.01)
(Continued)

(52) U.S. Cl.
CPC .......... *G06F 21/64* (2013.01); *G06F 12/1416* (2013.01); *G06F 21/52* (2013.01);
(Continued)

(58) Field of Classification Search
CPC ...... G06F 21/64; G06F 12/1416; G06F 21/52; G06F 21/566; G06F 21/6218; G06F 21/79; G06F 2221/1052
See application file for complete search history.

(56) References Cited

U.S. PATENT DOCUMENTS 7,185,246 B2    2/2007  Cochran et al.
7,785,204 B2 *  8/2010  Wells ............... A63F 13/12
                                                      380/251
(Continued)

FOREIGN PATENT DOCUMENTS

CN    102077204 A     5/2011
WO    WO-2007/118154 A2    10/2007

OTHER PUBLICATIONS

Extended European Search Report, EP Application No. 13896796.3, dated Apr. 6, 2017, pp. 1-10, EPO.
(Continued)

*Primary Examiner* — Ghodrat Jamshidi
(74) *Attorney, Agent, or Firm* — Hewlett Packard Enterprise Patent Department (57) ABSTRACT

According to an example, memory integrity checking may include receiving computer program code, and using a loader to load the computer program code in memory. Memory integrity checking may further include verifying the integrity of the computer program code by selectively implementing synchronous verification and/or asynchronous verification. The synchronous verification may be based on loader security features associated with the loading of the computer program code. Further, the asynchronous verification may be based on a media controller associated with the memory containing the computer program code.

20 Claims, 4 Drawing Sheets

(51) Int. Cl.
*G06F 21/52* (2013.01)
*G06F 21/56* (2013.01)
*G06F 21/79* (2013.01)
*G06F 12/14* (2006.01)
*G06F 21/62* (2013.01)

(52) U.S. Cl.
CPC ........ *G06F 21/566* (2013.01); *G06F 21/6218* (2013.01); *G06F 21/79* (2013.01); *G06F 2212/1052* (2013.01)

(56) References Cited

U.S. PATENT DOCUMENTS

| | | | |
|---|---|---|---|
| 8,307,193 | B2 | 11/2012 | Sehr et al. |
| 2003/0212859 | A1* | 11/2003 | Ellis ............... G06F 3/0613 711/114 |
| 2007/0005992 | A1 | 1/2007 | Schluessler et al. |
| 2007/0186279 | A1 | 8/2007 | Zimmer et al. |
| 2007/0192761 | A1 | 8/2007 | Sahita et al. |
| 2008/0077767 | A1 | 3/2008 | Khosravi et al. |
| 2009/0172814 | A1 | 7/2009 | Khosravi et al. |
| 2009/0217377 | A1* | 8/2009 | Arbaugh ............ G06F 11/348 726/23 |
| 2010/0169968 | A1 | 7/2010 | Shanbhogue et al. |
| 2011/0202313 | A1 | 8/2011 | Wilson et al. |
| 2012/0042376 | A1* | 2/2012 | Dolgunov ........... G06F 9/4406 726/19 |
| 2012/0246470 | A1* | 9/2012 | Nicolson ............. G06F 21/51 713/158 |
| 2012/0297057 | A1 | 11/2012 | Ghosh et al. |
| 2013/0275391 | A1* | 10/2013 | Batwara ........... G06F 17/30085 707/689 |
| 2013/0276149 | A1* | 10/2013 | Gremaud ............ G06F 21/64 726/30 |
| 2015/0052616 | A1* | 2/2015 | Hutchison ........... G06F 21/53 726/27 |

OTHER PUBLICATIONS

Owen S. Hofmann et al., "Ensuring Operating System Kernel Integrity with OSck," 2011, pp. 279-290, ACM.
G. Edward Suh et al., "Efficient Memory Integrity Verification and Encryption for Secure Processors," Oct. 1, 2003, pp. 1-12, IEEE.
IBM Corporation, "IBM Power 780 Server," IBM Systems and Technology, Data Sheet, Oct. 2012, pp. 1-8.
International Search Report and Written Opinion, International Application No. PCT/US2013/067766, dated Jul. 28, 2014, pp. 1-7, KIPO.
Jiang Wang et al., "HyperCheck: A Hardware-Assisted Integrity Monitor," Jul. 3, 2010, pp. 1-20, George Mason University, Available at: <cs.gmu.edu/~astavrou/research/Hypercheck_raid10.pdf>.
Mandiant, "APT1: Exposing One of China's Cyber Espionage Units," Wnitepaper, Feb. 2013, pp. 1-76.
Michael Riley and Ben Elgin, "China's Cyberspies Outwit Model for Bond's Q," May 2, 2013, pp. 1-10, Bloomberg Technology, Available at: <bloomberg.com/news/2013-05-01/china-cyberspies-outwit-u-s-stealing-military-secrets.htm>.
Wikipedia, "NX bit," Sep. 3, 2013, pp. 1-8, Available at: <en.wikipedia.org/wiki/NX_bit#Exec_Shield>.
Wikipedia, "Rootkit," Dec. 11, 2016, pp. 1-15, Available at: <en.wikipedia.org/wiki/Rootkit>.

* cited by examiner

MEMORY INTEGRITY CHECKING

BACKGROUND

An operating system (OS) typically includes a collection of software (i.e., machine readable instructions) that manages computer hardware resources and provides common services for computer programs. The OS typically includes a loader that is responsible for loading computer programs. For example, the loader places computer programs into memory, and further prepares the computer programs for execution. The loader typically operates by reading the contents of an executable file containing the computer program instructions into memory, and then performing other preparatory tasks to prepare the executable file for running. For example, the loader typically prepares computer program code for execution by relocating memory addresses so that they point to the correct location when a function call is made to the computer program code in another module, such as a shared library. The loader also sets the protection flags on memory pages in which the computer program code is placed. Once the loading is completed, the OS may start the computer program by passing control to the loaded computer program code.

BRIEF DESCRIPTION OF DRAWINGS

Features of the present disclosure are illustrated by way of example and not limited in the following figure(s), in which like numerals indicate like elements, in which:

FIG. 3 illustrates further details of the method for implementing the memory integrity checking apparatus, according to an example of the present disclosure.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Computer program code may be loaded and placed into memory by an authorized or an unauthorized user. For example, an unauthorized user may install computer program code for nefarious purposes. In order to assure that the computer program code is installed by an authorized user, integrity of computer program code may be based on proper operation and control of the loader and the OS. Alternatively or additionally, integrity of computer program code that is loaded and placed into memory may be based on proper operation and control of the OS virtual memory component that is responsible for memory page table translation mechanisms. The functionality of the loader may be extended with additional security features so that the loader checks every piece of computer program code that is loaded against possible virus or malware signatures, and determines whether the associated computer program is safe. The loader may place every piece of executable computer program code in an immutable page (e.g., marked eXecutable, non-Writable, or non-Readable), if supported by the target instruction set. Further, the loader may confirm that all other memory pages are marked Non-eXecutable (e.g., data pages). These aspects related to the functionality of the loader may ensure that trusted computer program code runs on a computer. Further, self-modifying computer program code may need to request permissions to write a code page, so that the loader and the OS have an opportunity to re-check.

The robustness of the aforementioned techniques of ensuring integrity of computer program code may be related to how well the loader and page translation mechanisms of the OS are compartmentalized and isolated. If the loader and page translation mechanisms of the OS are subverted, integrity of the computer program code may be compromised. For example, the loader and page translation mechanisms of the OS may be subverted by an unauthorized entity that makes unauthorized changes to page permissions, or by subverting the loading mechanism to inject unauthorized code (e.g., malware). Thus the robustness of the aforementioned techniques of ensuring integrity of computer program code may be based on full control and trust of the OS. In the event a hypervisor is located between the hardware and the virtual guest OS, further challenges may be added to ensure the robustness of the aforementioned techniques of ensuring integrity of computer program code since multiple levels of computer program code executions may occur, and the hardware may lack the protection support to capture all possible combinations.

According to examples, a memory integrity checking apparatus and a method for implementing the memory integrity checking apparatus are disclosed herein. The apparatus and method disclosed herein may generally provide for checking the integrity of computer program code in a system with active memory capabilities based on synchronous verification, and/or based on asynchronous verification. Generally, integrity checking of computer program code may be offloaded to an active media controller embedded in a memory subsystem. Compared to integrity checking techniques that are limited to software (i.e., machine readable instructions), the apparatus and method disclosed herein may eliminate the need to trust the OS. Further, the apparatus and method disclosed herein may reduce the performance loss implications of continuously checking computer program code in software. The apparatus and method disclosed herein may also provide for secure and robust checking of the integrity of computer program code outside of a possibly infected OS. Since the apparatus and method disclosed herein provide for secure and robust checking of the integrity of computer program code outside of a possibly infected OS, the apparatus and method disclosed herein may not be disabled or interfered with by a root-kit.

As described in further detail below, the apparatus and method disclosed herein may provide for implementation of a computing system that includes active memory elements associated with an active memory. The active memory may include programs for autonomously checking memory ranges to avoid security issues. Contiguous physical memory may be interleaved among multiple memory banks, and associative hashes may be used such that each individual media controller, associated with individual memory subsystems of the memory, may perform an independent hash of the non-contiguous memory range that is controlled by the media controller. The loader of executable programs may instruct the active memory elements (e.g., the media controllers, and associated media controllers) to perform a hash check against a safe hash. The active media controllers may automatically (e.g., without human intervention) and continuously check every written memory range against a set of known unauthorized associative hashes, for example, for viruses or malware. The OS may provide the active media controllers a range of addresses where executable computer program code is loaded. The active media controllers may therefore restrict scans to ranges that are known to contain executable computer program code (i.e., not data). The OS may provide the active media controllers a list of function pointers and an approved list of physical address values corresponding to known authorized safe routines. The function pointers may be converted to physical addresses. The active media controllers may inspect the memory content of function pointers, and may further avoid scanning a target range when a function pointer refers to a known authorized function.

Figure 1:
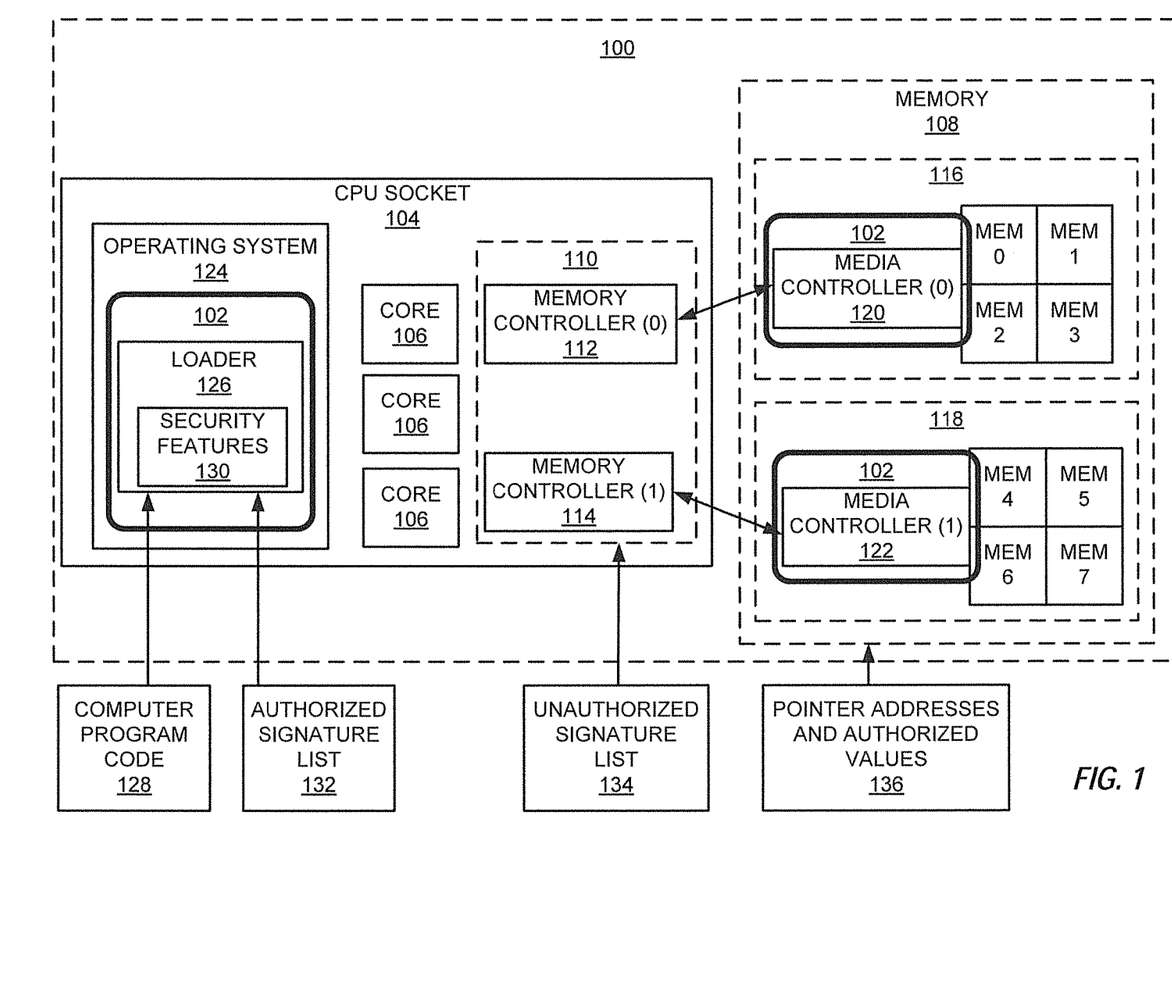
FIG. 1 illustrates an environment including a memory integrity checking apparatus, according to an example of the present disclosure.

FIG. 1 illustrates an environment 100 including a memory integrity checking apparatus 102, according to an example of the present disclosure. Referring to FIG. 1, the environment 100 of the memory integrity checking apparatus 102 is depicted as including a central processing unit (CPU) socket 104 including a plurality of CPU cores 106 that communicate with memory 108 through a memory controller 110. In the example of FIG. 1, the memory controller 110 is illustrated as a dual channel memory controller including a memory controller 112 (i.e., memory controller (0)), and a memory controller 114 (i.e., memory controller (1)). Alternatively, the memory controller 110 may include a single or multi-channel memory controller. The dual channel memory controller 110 including the memory controller 112 and the memory controller 114 may be responsible for issuing accesses to the memory 108. The memory 108 may include memory sub-systems 116 and 118 that include media controllers respectively corresponding to the memory controller 112 and the memory controller 114. For example, a media controller 120 (i.e., media controller (0)) may correspond to the memory controller 112, and a media controller 122 (i.e., media controller (1)) may correspond to the memory controller 114. The media controllers 120 and 122 may be embedded in the memory sub-systems 116 and 118 of the memory 108. Further, the media controllers 120 and 122 may deal with media specific features, and support advanced active features. For example, an active media controller may autonomously execute functions that are programmed by OS 124 on the memory segment that is controlled by the media controller. The OS 124 may include a loader 126 that is responsible for loading computer program code 128 in the memory 108. In the example of FIG. 1, the media controller 120 may address memory pages 0-3, and the media controller 122 may address memory pages 4-7.

Generally, the memory integrity checking apparatus 102 may evaluate the integrity of the computer program code 128 in a system that includes the environment 100 with active memory capabilities based on synchronous verification and/or asynchronous verification. With respect to synchronous verification, the memory integrity checking apparatus 102 may implement security features 130 in the loader 126 to evaluate the integrity of the computer program code 128. With respect to asynchronous verification, the memory integrity checking apparatus 102 may utilize the media controllers 120 and/or 122 to evaluate the integrity of the computer program code 128.

As described herein, certain elements of the apparatus 102 may be implemented by using machine readable instructions stored on a non-transitory computer readable medium. In addition, or alternatively, certain elements of the apparatus 102 may be implemented by using hardware or a combination of machine readable instructions and hardware.

Referring to FIG. 1, for the environment 100 of the memory integrity checking apparatus 102, a single physical memory page corresponding to the computer program code 128 may be materially partitioned into separate physical memory pages. For example, a single physical memory page may be materially partitioned into separate physical memory pages when memory is interleaved across multiple memory channels for improving performance. For the example of FIG. 1, if the memory 108 is interleaved at 64 B granularity (e.g., a cache line), the channel (0) media controller (0) (i.e., the media controller 120) may own the memory ranges [0:63], [128:191], etc. Further, the channel (1) media controller (1) (i.e., the media controller 122) may own the memory ranges [64:127], [192:255], etc.

Generally, the memory integrity checking apparatus 102 may utilize memory page-based hashing to evaluate the integrity of the computer program code 128. Since each of the media controllers 120 and 122, illustrated in the example of FIG. 1, may not see a contiguous memory range, the memory integrity checking apparatus 102 may hash ranges of memory independently and combine the ranges. Since contiguous address blocks may not be stored in contiguous areas on the memory 108, the memory integrity checking apparatus 102 may use associative hash functions (H) that include the following properties:

$$H(H(c1,c2),H(c3))=H(c1,H(c2,c3)) \qquad \text{Equation (1)}$$

$$H(c1,H(c2,c3))=H(c1,c2,c3) \qquad \text{Equation (2)}$$

For Equations (1) and (2), c1, c2, and c3 may represent blocks (i.e., ranges) of the memory 108, for example, associated with the memory pages 0-3, and 4-7 in the example of FIG. 1.

As disclosed herein, the memory integrity checking apparatus 102 may evaluate the integrity of the computer program code 128 in a system including an environment, such as the environment 100 with active memory capabilities, based on synchronous verification, and/or based on asynchronous verification. Synchronous verification may generally include proactive memory integrity checking, and asynchronous verification may generally include reactive memory integrity checking. With respect to synchronous verification, the memory integrity checking apparatus 102 may trust the loader 126, without trusting the OS 124. With respect to synchronous verification, the memory integrity checking apparatus 102 may include the loader 126 including the security features 130 to evaluate the integrity of the computer program code 128.

According to a security feature of the security features 130, the loader 126 may evaluate every element of the computer program code 128 that is loaded. For example, the loader 126 may check a signature associated with the computer program code 128. For example, the loader 126 may compute a hash and compare the hash to an authorized signature list 132 (e.g., a whitelist).

According to another security feature of the security features 130, the loader 126 may compute and update the hash of the physical blocks (e.g., memory pages) the computer program code 128 is loaded into. The computation and update of the hash of the physical blocks may be performed as part of the loading process. For example, the computation and update of the hash of the physical blocks may be performed synchronously with the loading process. For example, the computation and update of the hash of the physical blocks may be performed when addresses are being fixed (i.e., relocated).

According to another security feature of the security features 130, once the computer program code 128 is determined to be safe, the loader 126 may send pairs (i.e., {hash, range}) to all the memory controllers of the involved memory sub-systems 116 and/or 118 that cover the updated physical ranges. The loader 126 may also instruct the memory controllers 112 and/or 114 to continuously check that the memory page hash has not changed. Thus, the loader 126 of executable programs may instruct the active memory elements (e.g., the memory controllers 112 and/or 114, and thus the media controllers 120 and/or 122) to perform a hash check against a safe hash (e.g., a whitelist of safe programs).

According to another security feature of the security features 130, when the OS 124 replaces one of the "safe" memory pages (e.g., for recycling purposes), the OS 124 may send a command to the media controllers 120 and/or 122 to no longer check the specific page range, and to remove the previous hash. If the loader 126 sees the same program (i.e., computer program code 128) again, the loader 126 may load that page range in different physical memory pages to thus produce a separate safe hash.

With respect to synchronous verification that includes the loader 126 including the security features 130, the synchronous verification may identify changes to the computer program code 128 that originate from unauthorized OS code or other unknown sources. For any information that is installed in a memory page without being checked and hashed, the synchronous verification may not identify such information since identification of such information may need all other memory pages to be protected, and thus trusting the OS 124. For synchronous verification, the OS 124 may refuse to set execute rights on computer program code that is not loaded by loader 126, and is therefore untrusted. Thus, the loader 126 may sign loaded memory pages to certify that the memory pages have been loaded by a legitimate authority, such as the loader 126. The OS 124 or a separate trusted element may scan the memory pages to identify memory pages that have violated this invariant (i.e., are not signed by the loader 126).

For frequently invoked and short running programs (e.g., "ls"), since such programs may not be resident long enough to have an integrity scan, such programs are also unlikely to be resident long enough to be over-written. The loader 126 may verify the integrity of such programs when they are loaded. The initial integrity check by the loader 126 may guard against the loading of an unauthorized (e.g., trojaned) version of such programs to execute.

With respect to asynchronous verification, the memory integrity checking apparatus 102 may not trust the loader 126 or the OS 124. Generally, the memory integrity checking apparatus 102 may use the active memory elements (e.g., the memory controllers 112 and/or 114, and thus the media controllers 120 and/or 122), where the active memory 108 may include programs for autonomously checking memory ranges to avoid security issues. The memory integrity checking apparatus 102 may evaluate every piece of code (or data) for the computer program code 128 that is placed in the memory 108, asynchronously and continuously. For asynchronous verification, the media controllers 120 and/or 122 may be used to check for unauthorized (e.g., bad) signatures, for example, at every time an executable memory page is written to the memory 108. Checking for unauthorized signatures may include accounting for multiple interleaved memory chips and non-contiguous physical memory pages. For example, contiguous physical memory may be interleaved among multiple memory banks, and associative hashes (as discussed above with respect to Equations (1) and (2)) may be used such that each individual media controller (in each of the individual memory subsystems 116, 118) may perform an independent hash of the non-contiguous memory range that it controls. Asynchronous verification may be used to identify any unauthorized code. Further, asynchronous verification may be performed and managed as a separate operation compared to the operations of the loader 126 and/or OS 124.

For asynchronous verification, the memory integrity checking apparatus 102 may use the media controllers 120 and/or 122 to perform a hash check, and to further identify all the unauthorized signatures associated with the hash check. For example, the media controllers 120 and/or 122 may ensure that any information that is written to the memory 108 matches the hash for the computer program code 128 that the loader 126 has determined to be safe. The program associated with the computer program code 128 may run without any interference from the operation of the media controllers 120 and/or 122 with respect to the asynchronous verification. An unauthorized signature list 134 may be shared (or copied) with the memory controller 110. Further, the unauthorized signature list 134 may be updated at predetermined intervals. The active media controllers 120 and/or 122 may automatically (e.g., without human intervention) and continuously check every written memory range against a set of known unauthorized associative hashes in the unauthorized signature list 134, for example, for viruses or malware.

Generally the memory integrity checking apparatus 102 may use the media controllers 120 and/or 122 to identify where a given executable (i.e., executable computer program code) is allocated when it is loaded into the memory 108. With respect to operating systems that are based, for example, on position independent code (PIC), shared relocatable libraries, or address space layout randomization (ASLR), the location of a given executable may be challenging to determine, or may be unpredictable. In this case, the memory integrity checking apparatus 102 may use hints from the OS 124 at the active media controllers 120 and/or 122 with respect to the location of executable code. Thus, the OS 124 may provide the active media controllers 120 and/or 122 a range of addresses where executable computer program code is loaded. The active media controllers 120 and/or 122 may therefore restrict scans to ranges that are known to contain executable computer program code (i.e., not data). Alternatively, the media controllers 120 and/or 122 may routinely scan (e.g., in the background) the memory 108 to locate unauthorized signatures. Since the scanning may be performed in the background, the scanning may be combined with other scanning functions. For example, the scanning may be combined with wear-leveling in case of non-volatile memory (NVM), or error checking.

With respect to dynamic kernel integrity protection for the memory integrity checking apparatus 102, a list of specific kernel function pointers may be developed from a base-line authorized (e.g., good) kernel. For example, the list of specific kernel function pointers may include file system open, read, and write calls. Dynamic kernel integrity protection for the memory integrity checking apparatus 102 may also include generation of an authorized list of values (e.g., addresses in memory) that the kernel function pointers may legitimately point to (e.g., such as to the ext3 implementation of the kernel function pointers). Since kernel malware may generally operate by re-directing kernel function pointers to malicious code instead of legitimate targets, a list of pointer addresses and authorized values 136 that correspond to known authorized kernel function pointers in the memory 108 may be received by the media controllers 120 and/or 122. The memory integrity checking apparatus 102 may use the media controllers 120 and/or 122 to asynchronously check that the contents of the memory address of the pointers contain a value matching one in the list of pointer addresses and authorized values 136 for that particular pointer address. Thus, the OS 124 may provide the active media controllers 120 and/or 122 a list of function pointers and an approved list (i.e., the list of pointer addresses and authorized values 136) of physical address values corresponding to known authorized safe routines. The kernel function pointers may be converted to physical addresses. The active media controllers 120 and/or 122 may inspect the memory content of function pointers, and may further avoid scanning a target range when a function pointer refers to a known authorized function.

Figure 2:
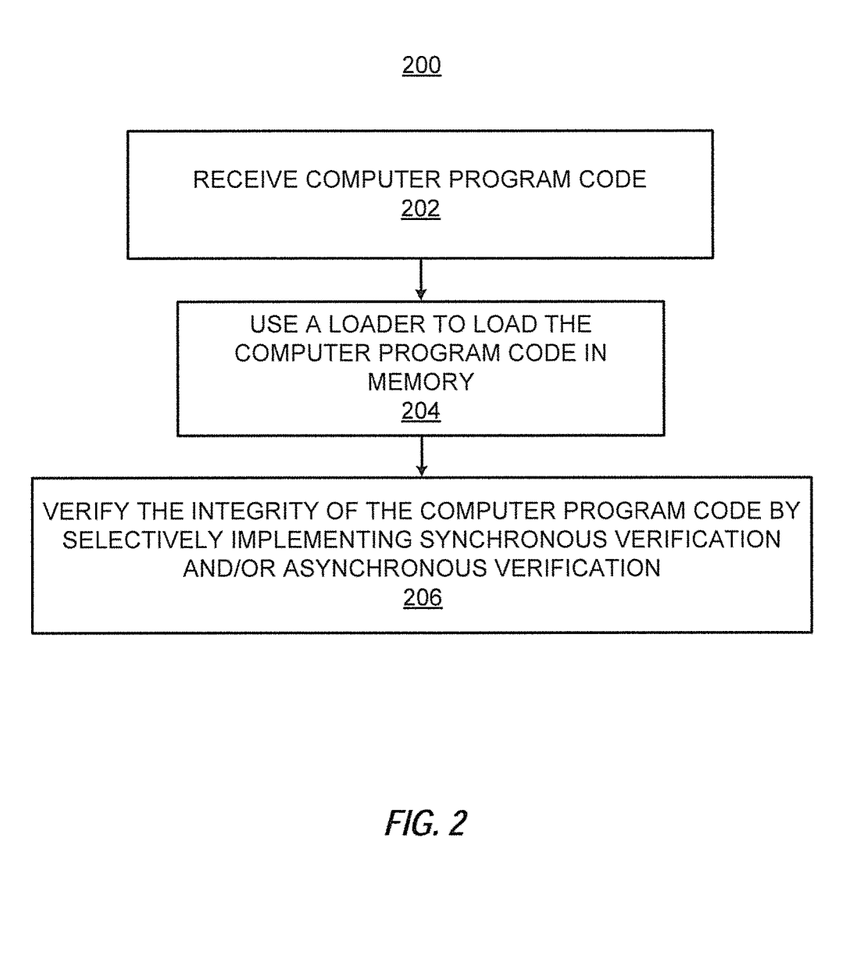
FIG. 2 illustrates a method for implementing the memory integrity checking apparatus, according to an example of the present disclosure.

FIGS. 2 and 3 respectively illustrate flowcharts of methods 200 and 300 for implementing the memory integrity checking apparatus 102 whose construction is described in detail above. The methods 200 and 300 may be implemented on the memory integrity checking apparatus 102 with reference to FIG. 1 by way of example and not limitation. The methods 200 and 300 may be practiced in other apparatus.

Referring to FIG. 2, for the method 200, at block 202, the method may include receiving computer program code. For example, referring to FIG. 1, the method may include receiving the computer program code 128.

At block 204, the method may include using a loader to load the computer program code in memory. For example, referring to FIG. 1, the OS 124 may include the loader 126 that is responsible for loading the computer program code 128 in the memory 108.

At block 206, the method may include verifying the integrity of the computer program code by selectively implementing synchronous verification and/or asynchronous verification. The synchronous verification may be based on loader security features associated with the loading of the computer program code. Further, the asynchronous verification may be based on a media controller associated with the memory containing the computer program code. For example, referring to FIG. 1, with respect to synchronous verification, the memory integrity checking apparatus 102 may implement the security features 130 in the loader 126 to evaluate the integrity of the computer program code 128. With respect to asynchronous verification, the memory integrity checking apparatus 102 may utilize the media controllers 120 and/or 122 to evaluate the integrity of the computer program code 128.

According to an example, implementing the synchronous verification may further include evaluating a signature associated with the computer program code 128. According to an example, implementing the synchronous verification may further include computing a hash associated with the computer program code 128, and comparing the hash to the authorized signature list 132. According to an example, implementing the synchronous verification may further include computing a hash associated with the computer program code 128, and using the computed hash to update a hash of memory pages that are associated with the computer program code 128 and are loaded in the memory 108. According to an example, implementing the synchronous verification may further include sending pairs including the computed hash and associated range for the memory pages (i.e., {hash, range}) to a memory controller 110, and instructing the memory controller 110 to detect a change in the computed hash related to the associated range for the memory pages. According to an example, implementing the synchronous verification may further include determining when the OS 124 has replaced a safe memory page associated with the computer program code 128, and in response to a determination that the OS 124 has replaced the safe memory page associated with the computer program code 128, instructing the media controller (e.g., media controllers 120 and/or 122) to stop checking a memory page range associated with the replaced safe memory page, and to remove a previous hash associated with the replaced safe memory page.

According to an example, the media controller may include a plurality of active media controllers (e.g., the media controllers 120 and/or 122) that are associated with a plurality of active memory controllers (e.g., the memory controllers 112 and/or 114).

According to an example, implementing the asynchronous verification may further include using the media controller (e.g., the media controllers 120 and/or 122) associated with the memory 108 to identify an unauthorized signature associated with the computer program code 128. According to an example, using the media controller (e.g., the media controllers 120 and/or 122) associated with the memory 108 to identify an unauthorized signature associated with the computer program code 128 may further include comparing a signature associated with the computer program code 128 to an unauthorized signature list 134. According to an example, using the media controller (e.g., the media controllers 120 and/or 122) associated with the memory 108 to identify an unauthorized signature associated with the computer program code 128 may further include accounting for a plurality of interleaved memory chips and non-contiguous memory pages associated with the computer program code 128. According to an example, accounting for a plurality of interleaved memory chips and non-contiguous memory pages associated with the computer program code 128 may further include using associative hashing (e.g., Equations (1) and (2)) to compute independent hashes of the non-contiguous memory pages associated with the computer program code 128. According to an example, implementing the asynchronous verification may further include receiving, at the media controller (e.g., the media controllers 120 and/or 122), information related to locations of a range of addresses related to the computer program code 128 in the memory 108, from the OS 124. According to an example, implementing the asynchronous verification may further include using the asynchronous verification for kernel integrity protection by determining a plurality of authorized kernel function pointers, using the authorized kernel function pointers to generate an authorized list of values (e.g., the list of pointer addresses and authorized values 136) that the authorized kernel function pointers point to, sending the authorized list of values to the media controller (e.g., the media controllers 120 and/or 122), and using the media controller to determine that contents of memory address of pointers for a kernel contain a value matching the authorized list of values.

Referring to FIG. 3, for the method 300, at block 302, the method may include receiving computer program code. For example, referring to FIG. 1, the method may include receiving the computer program code 128.

At block 304, the method may include using a loader to load the computer program code in memory. For example, referring to FIG. 1, the OS 124 may include the loader 126 that is responsible for loading the computer program code 128 in the memory 108.

At block 306, the method may include verifying the integrity of the computer program code by selectively implementing synchronous verification and/or asynchronous verification. The synchronous verification may be based on loader security features associated with the loader, and the asynchronous verification may be based on a media controller associated with the memory. For example, referring to FIG. 1, with respect to synchronous verification, the memory integrity checking apparatus 102 may implement the security features 130 in the loader 126 to evaluate the integrity of the computer program code 128. With respect to asynchronous verification, the memory integrity checking apparatus 102 may utilize the media controllers 120 and/or 122 to evaluate the integrity of the computer program code 128.

At block 308, the method may include performing the asynchronous verification as a separate operation compared to the operation of the loader and an OS. For example, referring to FIG. 1, the method may include performing the asynchronous verification as a separate operation compared to the operation of the loader 126 and the OS 124.

Figure 4:
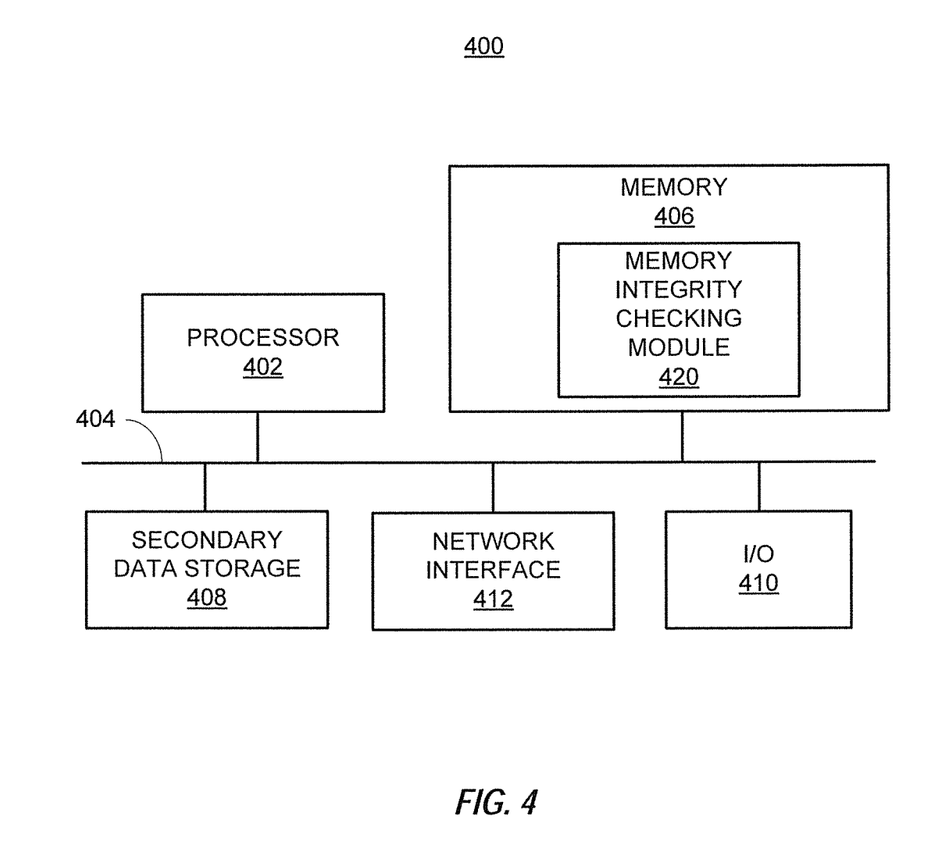
FIG. 4 illustrates a computer system that may be used to implement the memory integrity checking apparatus, according to an example of the present disclosure.

FIG. 4 shows a computer system 400 that may be used with the examples described herein. The computer system may represent a generic platform that includes components that may be in a server or another computer system. The computer system 400 may be used as a platform for the apparatus 102. The computer system 400 may execute, by a processor (i.e., a single processor, or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 may include a processor 402 that may implement or execute machine readable instructions performing some or all of the methods, functions and other processes described herein. Commands and data from the processor 402 may be communicated over a communication bus 404. The computer system may also include a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The memory 406 may include a memory integrity checking module 420 including machine readable instructions residing in the memory 406 during runtime and executed by the processor 402. The memory integrity checking module 420 may include certain elements of the apparatus 102 shown in FIG. 1.

The computer system 400 may include an I/O device 410, such as a keyboard, a mouse, a display, etc. The computer system may include a network interface 412 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A non-transitory computer readable medium having stored thereon machine readable instructions to provide memory integrity checking, the machine readable instructions, when executed, cause at least one processor to:
    receive computer program code;
    use a loader to load the computer program code in memory; and
    verify the integrity of the computer program code by selectively implementing at least one of synchronous verification and asynchronous verification, wherein:
        the synchronous verification is based on loader security features associated with the loading of the computer program code; and
        the asynchronous verification is based on a media controller associated with the memory containing the computer program code, wherein the asynchronous verification is implemented by identifying an unauthorized signature associated with the computer program code via the media controller by comparing a signature associated with the computer program code to an unauthorized signature list.

2. The non-transitory computer readable medium of claim 1, wherein to implement the synchronous verification, the machine readable instructions, when executed, further cause the at least one processor to:
    compute a hash associated with the computer program code; and
    use the computed hash to update a hash of memory pages that are associated with the computer program code and are loaded in the memory.

3. The non-transitory computer readable medium of claim 2, wherein to implement the synchronous verification, the machine readable instructions, when executed, further cause the at least one processor to:
    send pairs including the computed hash and associated range for the memory pages to a memory controller; and
    instruct the memory controller to detect a change in the computed hash related to the associated range for the memory pages.

4. The non-transitory computer readable medium of claim 1, wherein to implement the synchronous verification, the machine readable instructions, when executed, further cause the at least one processor to:
    determine when an operating system (OS) has replaced a safe memory page associated with the computer program code; and
    in response to a determination that the OS has replaced the safe memory page associated with the computer program code, instruct the media controller to stop checking a memory page range associated with the replaced safe memory page, and to remove a previous hash associated with the replaced safe memory page.

5. The non-transitory computer readable medium of claim 4, wherein the machine readable instructions, when executed, further cause the at least one processor to load, in response to the computer program code being re-loaded by the loader, the computer program code to a memory page that is different than the replaced safe memory page to produce a separate safe hash.

6. The non-transitory computer readable medium of claim 1, wherein to use the media controller associated with the memory to identify an unauthorized signature associated with the computer program code, the machine readable instructions, when executed, further cause the at least one processor to:
account for a plurality of interleaved memory chips and non-contiguous memory pages associated with the computer program code.

7. The non-transitory computer readable medium of claim 6, wherein to account for a plurality of interleaved memory chips and non-contiguous memory pages associated with the computer program code, the machine readable instructions, when executed, further cause the at least one processor to:
use associative hashing to compute independent hashes of the non-contiguous memory pages associated with the computer program code.

8. The non-transitory computer readable medium of claim 1, wherein to implement the asynchronous verification, the machine readable instructions, when executed, further cause the at least one processor to:
use the asynchronous verification for kernel integrity protection by:
determine a plurality of authorized kernel function pointers;
use the authorized kernel function pointers to generate an authorized list of values that the authorized kernel function pointers point to;
send the authorized list of values to the media controller; and
use the media controller to determine that contents of memory address of pointers for a kernel contain a value matching the authorized list of values.

9. The non-transitory computer readable medium of claim 8, wherein the kernel function pointers include file system open, read, and write calls.

10. The non-transitory computer readable medium of claim 8, wherein the authorized list of values that the authorized kernel function pointers point to include addresses in memory.

11. A memory integrity checking apparatus comprising:
a loader to receive and load computer program code to memory, the loader including security features to implement synchronous verification to evaluate the integrity of the computer program code to be stored in the memory; and
a media controller corresponding to a memory controller, the media controller included in the memory to address a memory page, the media controller further implementing asynchronous verification to evaluate the integrity of the computer program code when stored in the memory by identifying an unauthorized signature associated with the computer program code by comparing a signature associated with the computer program code to an unauthorized signature list.

12. The memory integrity checking apparatus of claim 11, wherein the media controller includes a plurality of active media controllers that are associated with a plurality of active memory controllers.

13. The memory integrity checking apparatus of claim 11, wherein the media controller further implements the asynchronous verification by:
receiving, at the media controller, information related to locations of a range of addresses related to the computer program code to be stored in the memory, from an operating system (OS).

14. A method for memory integrity checking, the method comprising:
receiving computer program code;
using a loader to load the computer program code in memory; and
verifying the integrity of the computer program code by selectively implementing at least one of synchronous verification and asynchronous verification, wherein:
the synchronous verification is based on loader security features associated with the loader; and
the asynchronous verification is based on a media controller associated with the memory, wherein the asynchronous verification is implemented by identifying an unauthorized signature associated with the computer program code via the media controller by comparing a signature associated with the computer program code to an unauthorized signature list.

15. The method of claim 14, wherein implementing the synchronous verification further comprises:
evaluating a signature associated with the computer program code.

16. The method of claim 14, wherein implementing the synchronous verification further comprises:
computing a hash associated with the computer program code; and
comparing the hash to an authorized signature list.

17. The method of claim 14, wherein identifying the unauthorized signature includes performing, by a plurality of media controllers, an independent hash of each respective non-contiguous memory range that each media controller of the plurality of media controllers controls.

18. The method of claim 14, further comprising refusing to set execute rights on the computer program code in response to the integrity of the computer program code not being verified via the synchronous verification.

19. The method of claim 14, further comprising signing loaded memory pages to certify the loaded memory pages have been loaded by a legitimate authority in response to the integrity of the computer program code being verified via the synchronous verification.

20. The method of claim 14, further comprising:
receiving, by the media controller, a range of addresses where the computer program code is located; and
using the loader to load the computer program code in the memory based on the range of addresses received by the media controller.

* * * * *